United States Patent [19]

Bucci

[11] 4,192,624
[45] Mar. 11, 1980

[54] FRAME CORNER STRUCTURE

[75] Inventor: Carlo G. Bucci, Bronte, Canada

[73] Assignee: Repla Limited, Oakville, Canada

[21] Appl. No.: 831,521

[22] Filed: Sep. 8, 1977

[30] Foreign Application Priority Data

Jul. 20, 1977 [CA] Canada ................................. 283119

[51] Int. Cl.² .............................................. F16B 12/36
[52] U.S. Cl. ..................................... 403/295; 403/401
[58] Field of Search ............... 403/401, 402, 231, 295,
403/284, 285; 160/381

[56] References Cited

U.S. PATENT DOCUMENTS 2,861,659 11/1958 Hagerty et al. ........................ 403/231
3,767,237 10/1973 Suchowski ........................ 160/381 X

FOREIGN PATENT DOCUMENTS 2146570 10/1972 Fed. Rep. of Germany ........... 403/401

Primary Examiner—Wayne L. Shedd
Attorney, Agent, or Firm—Murray and Whisenhunt

[57] ABSTRACT

An improved corner frame structure and method of manufacturing it is provided. The corner is effected by joinder of channelled members by a solid bracelet having legs extending at the desired angle.

Each leg is provided with a pair of spaced apart depressions. Into these depressions, tongues are struck down to bind and urge the adjacent frame members together.

2 Claims, 4 Drawing Figures

FRAME CORNER STRUCTURE

BACKGROUND OF THE INVENTION

This invention relates to frame structures and more particularly to the structure of corners for such frames.

It has been common practice in the manufacture of aluminum window and door frames to use mitred joints which are either secured by welding or screws to support a piece joining the adjacent channels.

However, the weld joints and the screw joints have become expensive because of their high labour content.

They also have several individual shortcomings. The welded joints are difficult to maintain and the screw joints tend to loosen. With both types of joints, however, there has been the problem of strength. To provide strength, a relatively thick gauge of metal has to be provided to prevent warping.

The screw joints, if not countersunk, normally had to be provided on a surface of the window which if not visible, restricted the hinge movement, and if not hidden from view was exposed to the elements so that there was provided a further entry for the elements and deterioration of the structure.

Furthermore, the screw joints were not secure.

CONSIDERATION OF THE PRIOR ART

The most relevant art of which the applicants are aware is as follows:

| U.S. Pat. No. 1,745,818 | Trombly et al. | Feb. 4, 1930 |
|---|---|---|
| U.S. Pat. No. 2,101,349 | Sharp | Dec. 7, 1937 |
| U.S. Pat. No. 3,342,514 | Ivanhoe et al. | Sept. 19, 1967 |
| U.S. Pat. No. 3,767,237 | Suchowski | Oct. 23, 1973 |

Insofar as they are understood, the latter two patents require some further agency to effect the joint between the frame and the bar and the Sharp patent structure depends upon resilient barbed engagement between hard and soft metal to effect the joint.

The most relevant prior art appears to be Trombly, U.S. Pat. No. 1,745,818. However, it will be noted that in that structure only single depressions are formed on each leg and the struck up tongues which engage the depressions are previously formed.

These differences in structure and production lead to important differences in the final result as will be apparent from the description which follows.

SUMMARY OF THE INVENTION

With the disadvantages of the prior art in mind, it is the principle object of the present invention to provide a mitred corner frame structure which is strong, economical to produce and pleasing to the eye.

Generally, in the present invention, a solid bracket having a pair of legs at the desired angle is inserted, one leg in each channel of an adjacent frame element. On the surfaces of the bracket to which the frame elements are to be secured, a pair of depressions are provided, two on each leg.

The corner structure is then placed in a jig and a die sequentially strikes out the two pairs of tongues and urges them into engagement with the interior support bracket.

However, the actual process, the structure and the advantages which flow therefrom will be more fully understood from the following description of the invention and the drawings, in which a specific embodiment is described by way of example and in which.

Figure 1:
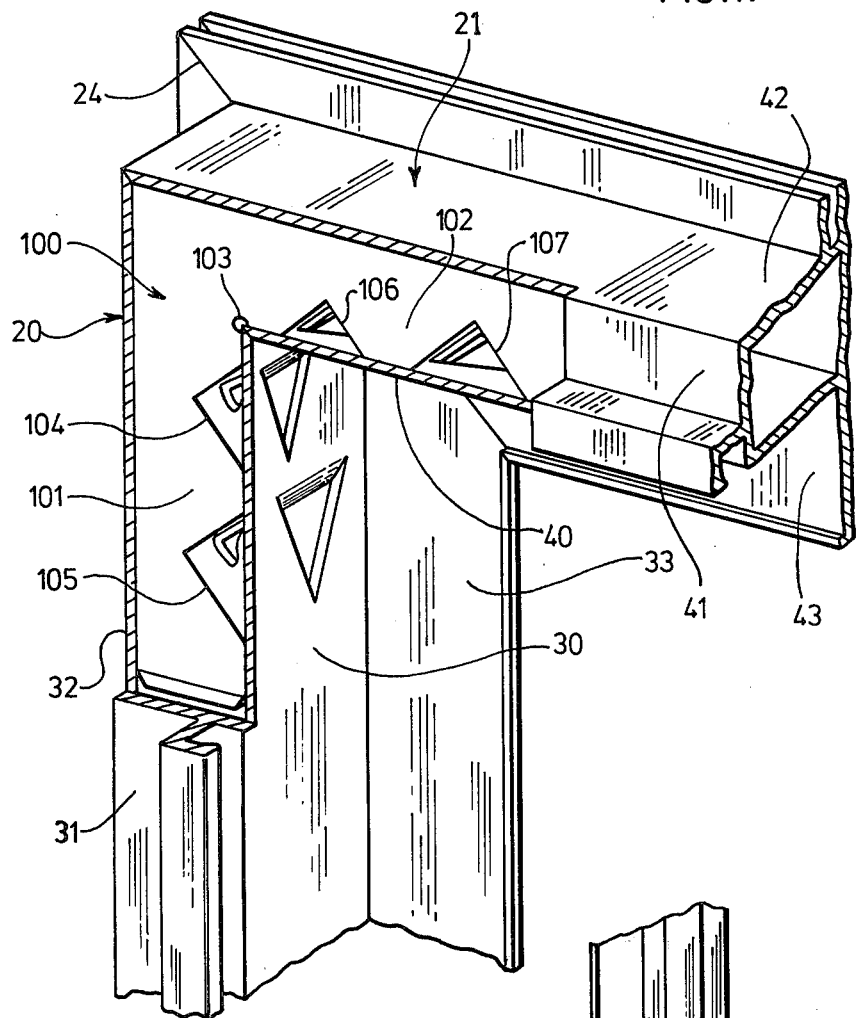
FIG. 1 is a general perspective view of a mitred frame in accordance with the present invention.

As shown in the drawings and more particularly FIG. 1, the structure which the present invention exhibits does not require any fastening elements apart from the structural elements themselves.

As shown in FIG. 1, each frame comprises frame elements 20 which are provided with mitred end surfaces 24 and in the final assembled product the frame, as will be evident from the description, may be made of any desired shape. The only essential criteria are the angles defined by the legs of the securing brackets.

As shown, each corner structure comprises a bracket 100 which in the embodiments illustrated each have two legs 101 and 102 which define a right angle.

The legs of bracket 100 fit within the channels defined by the frame members or elements 20. The frame members 20 and 21 in FIG. 1 have a substantially rectangular form which slidably receives the corresponding legs 101 and 102 of the bracket 100.

For convenience, the surfaces and walls of frame member 20 will be identified as 30, 31, 32 and 33 and those of member 21 as 40, 41, 42 and 43 respectively.

The bracket 100 has a plane, substantially unbroken surface along the extension surfaces of legs 101 and 102. However, the ends are chamfered to permit facility of insertion into the channel members and at the internal junction of legs 101 and 102 a cavity 103 is provided and on each of legs 101 and 102, two triangular depressions—104 and 105 on leg 101 and 106 and 107 on leg 102—are provided.

For the purposes of this description, it will be understood that depressions 104 and 106 will be described as the inner depressions and 105 and 107 will be referred to as outer depressions.

Figure 2:
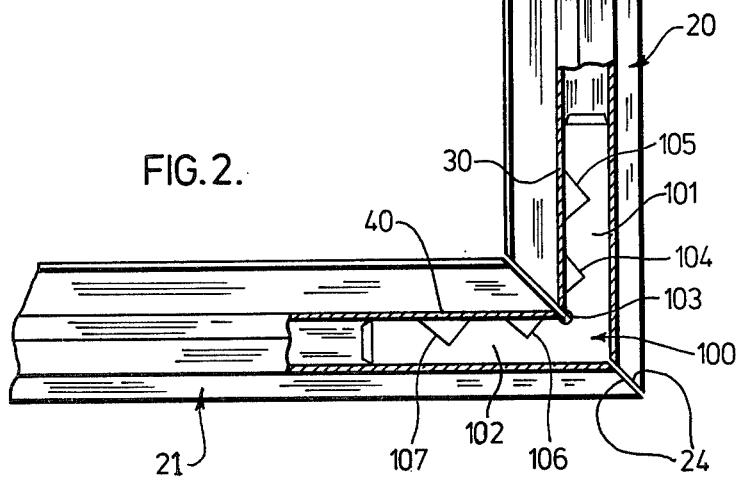
FIG. 2 is a section through a corner prior to effecting the junctions in accordance with the present invention.

Initially, the corner joint is assembled as illustrated in FIG. 2. The corner is then placed in a right-angled jig. The two frame members 20 and 21 are free to move. It will be noticed that there is in the initial position shown in FIG. 2 an opening in the mitre.

Figure 3:
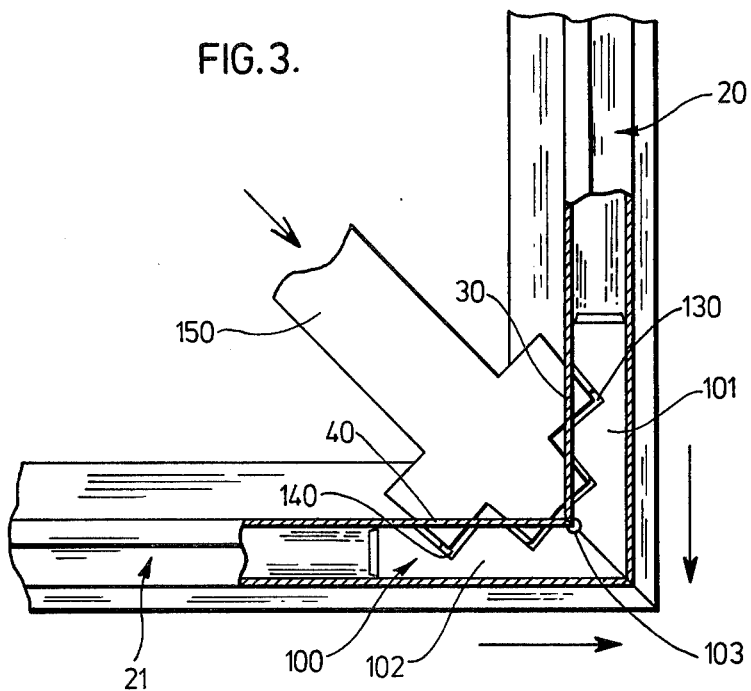
FIG. 3 is a further section of the corner illustrated in FIG. 2 immediately prior to impingement of the second part of the tool die.
Figure 4:
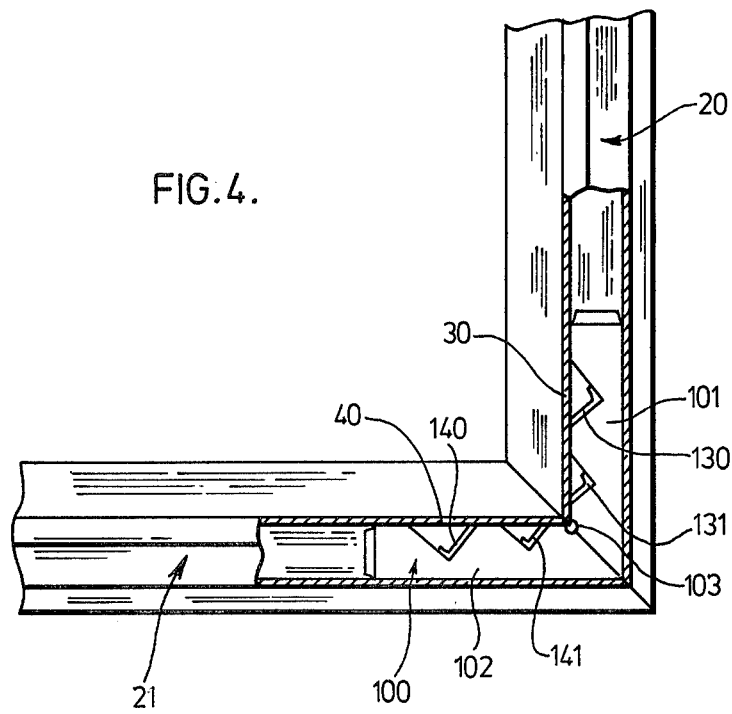
FIG. 4 is a section through a corner in accordance with the present invention.

As the die 150, shown diagrammatically in FIG. 3, moves in, it first engages surfaces 30 and 40 to cut and strike out tongues 130 and 140.

This initial action drives the respective frame elements 20 and 21 towards each other, that is in the directions of the arrow towards the corner.

As the tongues 130 and 140 have been cut and they are bent, they make engagement with the remote surface of depressions 105 and 107 from the corner.

Immediately in sucession, the second phase of the die impinges on surfaces 30 and 40 to strike tongues 131 and 141.

Depressions 104 and 106 are of reduced depth with respect to depressions 105 and 107. They are reduced in depth by the gauge of channel walls 30 and 40.

The action of the successive striking ensures that the corner is closed and locked. The interior junction of the bar with its cavity 103 permits the migration of the metal on the internal surfaces to be accommodated without distortion.

It will also be observed that the depressions 104 and 105 on leg 101 and depressions 106 and 107 on leg 102 are on opposite sides of the midline or axis of their respective sidewalls 30 and 40. Since channel members 20 and 21 are aluminum, the tongues which are stuck out are also on opposed sides of the midline.

This disposition precludes or limits the possibility of fracture or weakening of the frame if all the tongues are stuck out in alignment.

From the foregoing description, it will be seen that no other joining or fastening element is required to effect the junction.

It will also be evident that a minimum amount of labour is required. The joint at least from external purposes is clean and minimizes the exposure of the interior of the frame to the elements. Furthermore, the joint has been found to be extremely strong.

It will also be evident that any angled joint may be made with equal facility.

The embodiments of the invention in which an exclusive property or privilege is claimed are defined as follows:

1. A corner structure for window frames and the like comprising:
   a bracket having a pair of angularly disposed legs, each leg being of rigid metal and having a surface opposed to a surface on an adjacent leg, each opposed surface also having a pair of longitudinally spaced triangular depressions therein;
   a pair of metal frame members each having a longitudinally extending channel extending from a mitred end, each channel being defined by opposed sides slideably receiving a respective leg of the bracket;
   the depression in one surface of each leg nearest the opposed surface of the other leg having a depth less than the depth of the other depression by at least the thickness of the adjacent side of said channel; and
   the said adjacent side of each channel having a pair of longitudinally spaced tongues extending in a direction away from the respective mitred end into a respective depression, each tongue engaging at least part of both surfaces of the depression to urge said mitred ends of said frame members together, the two longitudinally spaced depressions in each leg being laterally offset relative to one another, with the tongues in said depressions being correspondingly laterally offset.

2. A corner structure according to claim 1 wherein the opposed surfaces of said legs of the bracket extend from a recessed internal corner receiving metal displaced from said mitred ends of said frame members by the urging together of said mitred ends by said tongues.

* * * * *